United States Patent
Chen et al.

(10) Patent No.: US 7,555,512 B2
(45) Date of Patent: Jun. 30, 2009

(54) RAM-BASED FAST FOURIER TRANSFORM UNIT FOR WIRELESS COMMUNICATIONS

(75) Inventors: Ying Chen, Saint Paul, MN (US); Barrett J Brickner, Savage, MN (US)

(73) Assignee: DSP Group Inc., Santa Clara, CA (US)

( * ) Notice: Subject to any disclaimer, the term of this patent is extended or adjusted under 35 U.S.C. 154(b) by 1510 days.

(21) Appl. No.: 10/234,060

(22) Filed: Aug. 30, 2002

(65) Prior Publication Data

US 2003/0050945 A1 Mar. 13, 2003

Related U.S. Application Data

(60) Provisional application No. 60/316,472, filed on Sep. 1, 2001.

(51) Int. Cl.
*G06F 17/14* (2006.01)
(52) U.S. Cl. .................................................. 708/409
(58) Field of Classification Search .................. 708/409
See application file for complete search history.

(56) References Cited

U.S. PATENT DOCUMENTS

| | | | |
|---|---|---|---|
| 4,117,541 A * | 9/1978 | Ali | 708/320 |
| 5,163,017 A * | 11/1992 | Wong et al. | 708/406 |
| 5,293,330 A * | 3/1994 | Sayegh | 708/406 |
| 5,313,413 A * | 5/1994 | Bhatia et al. | 708/408 |
| 5,602,835 A | 2/1997 | Seki et al. | |
| 5,808,925 A | 9/1998 | Ito et al. | |
| 5,848,097 A | 12/1998 | Carney et al. | |
| 5,890,098 A * | 3/1999 | Kozaki et al. | 702/77 |
| 5,946,293 A | 8/1999 | Beale et al. | |
| 6,098,088 A | 8/2000 | He et al. | |
| 6,247,034 B1 | 6/2001 | Nakai et al. | |
| 6,366,936 B1 | 4/2002 | Lee et al. | |
| 6,430,149 B1 | 8/2002 | Kobayashi | |
| 6,434,583 B1 | 8/2002 | Dapper et al. | |
| 2002/0178194 A1* | 11/2002 | Aizenberg et al. | 708/404 |

* cited by examiner

*Primary Examiner*—Tan V Mai
(74) *Attorney, Agent, or Firm*—Shumaker & Sieffert, P.A.

(57) ABSTRACT

A wireless communication technique enables fast Fourier transforms (FFTs) and inverse fast Fourier transforms (IFFTs) to be performed with reduced latency and reduced memory requirements. In particular, an FFT/IFFT unit receives input data representative of a communication symbol. The FFT/IFFT unit applies an FFT operation to the input data to generate intermediate data. The FFT/IFFT unit stores the intermediate data in a random access memory (RAM). The intermediate data stored in the RAM may override data used as input to the FFT operation. The FFT/IFFT unit selectively addresses the RAM to retrieve the intermediate data in a desired output order. For example, the FFT/IFFT unit may output the intermediate data in the same sequential order as the FFT/IFFT unit received the input data.

43 Claims, 5 Drawing Sheets

RAM-BASED FAST FOURIER TRANSFORM UNIT FOR WIRELESS COMMUNICATIONS

This application claims priority from U.S. Provisional Application Ser. No. 60/316,472, filed Sep. 1, 2001, the entire content of which is incorporated herein by reference.

TECHNICAL FIELD

The invention relates to wireless communications and, more particularly, to techniques for analyzing wireless signals communicated in a wireless communication system.

BACKGROUND

Wireless communication involves transmission of encoded information on a modulated radio frequency (RF) carrier signal. A wireless transceiver includes an RF antenna that receives and transmits wireless signals. The wireless transceiver converts the RF signal to a baseband signal for received signals and upconverts a baseband signal to RF for transmission of signals. In a multi-carrier wireless communication system, such as an orthogonal frequency division multiplexing (OFDM) system, the wireless transceiver applies a fast Fourier transform (FFT) to demodulate the received signal. Similarly, the transceiver applies an inverse fast Fourier transform (IFFT) to the signal to modulate a signal for transmission. The FFT translates a received signal from a time domain to a frequency domain. The IFFT does the opposite, translating a signal from the frequency domain to the time domain. The FFT and IFFT algorithms produce outputs that are out of order in relation to the inputs. For example, FFT or IFFT processing of input data in sequential order results in output data in a non-sequential order. For this reason, the outputs ordinarily must be reordered, e.g., using a buffer. However, the reordering of the outputs of the FFT or IFFT with a buffer can increase latency and memory costs.

SUMMARY

In general, the invention is directed to techniques for performing either a fast Fourier transform (FFT) or an inverse fast Fourier transform (IFFT) with reduced latency and reduced memory requirements. The invention makes use of a random access memory (RAM)-based FFT/IFFT unit and efficient storage and retrieval operations to simplify data reordering for increased throughput. The RAM-based FFT/IFFT unit may be suitable for a variety of applications, and especially useful in wireless communication.

The RAM-based FFT/IFFT unit receives input data representative of a communication symbol, and stores a portion the input data in RAM. The input data may include a number of observation samples for the communication symbol. The FFT/IFFT unit selectively chooses data from RAM, and performs arithmetic operations on the data to obtain intermediate data. The FFT/IFFT unit replaces the input data in the RAM with the intermediate data from the arithmetic operations. In this manner, the input data can be overwritten immediately after being supplied to the arithmetic operations, providing efficient memory usage. The FFT/IFFT unit selectively addresses the RAM to retrieve output data in a desired output order. For example, the FFT/IFFT unit may retrieve the output data in the same sequential order as the input data received by the FFT/IFFT unit.

The RAM may comprise multiple RAM memory banks, each with a read port and a write port. Multiple RAM memory banks may consume less power than a single RAM memory bank with multiple read and write ports, and therefore may be more desirable for applications such as mobile wireless communication in which power consumption is a concern. Further, multiple RAM memory banks with a single read and write port utilize a smaller area than a single RAM memory bank with multiple read and write ports due to the reduced complexity of decoding circuitry for memory addressing.

In some embodiments, however, the invention may be implemented using a single RAM memory bank with multiple read and write ports for simultaneous access to RAM addresses. Using multiple memory banks, the FFT/IFFT unit can apply a memory addressing technique that permits simultaneous multiple memory accessing with reduced hardware cost. For example, the FFT/IFFT unit can perform arithmetic operations on data from each of the multiple RAM memory banks. The intermediate data generated by the arithmetic operations can be written simultaneously in each memory bank, taking the place of the input data supplied to the FFT/IFFT unit for the arithmetic operations.

In one embodiment, the invention provides a method comprising receiving input data representative of a communication signal in a first order. The method further comprises applying a fast Fourier transform (FFT) operation to the input data to produce intermediate data. The method also includes storing the intermediate data in a second order in a random access memory (RAM). The method further includes selectively addressing the RAM to retrieve the intermediate data in a third order.

In another embodiment, the invention provides a device comprising a fast Fourier transform (FFT) unit that applies an FFT operation to input data to produce intermediate data. The device receives the input data in a first order. The device further comprises a random access memory (RAM) that stores the intermediate data in a second order. The device also includes a controller that selectively addresses the RAM to retrieve the intermediate data in a third order.

The invention may provide one or more advantages. For example, the RAM addressing techniques contemplated herein allow efficient retrieval of output data produced by the FFT or IFFT unit in a desired order. For example, the output data stored in RAM may be selectively retrieved in the same order as the input data was received. This ordering of outputs may be useful for different applications. For example, to conform to the IEEE 802.11a standard, a second half of the output data of the FFT may be output first, followed by a first half of the output data. This operation ensures that the output data ranges from $-\pi$ to $\pi$, rather than 0 to $2\pi$ as in the typical FFT algorithm. Further, a multiple memory bank RAM and the memory addressing techniques allow for simultaneous multiple memory accessing with reduced hardware cost.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
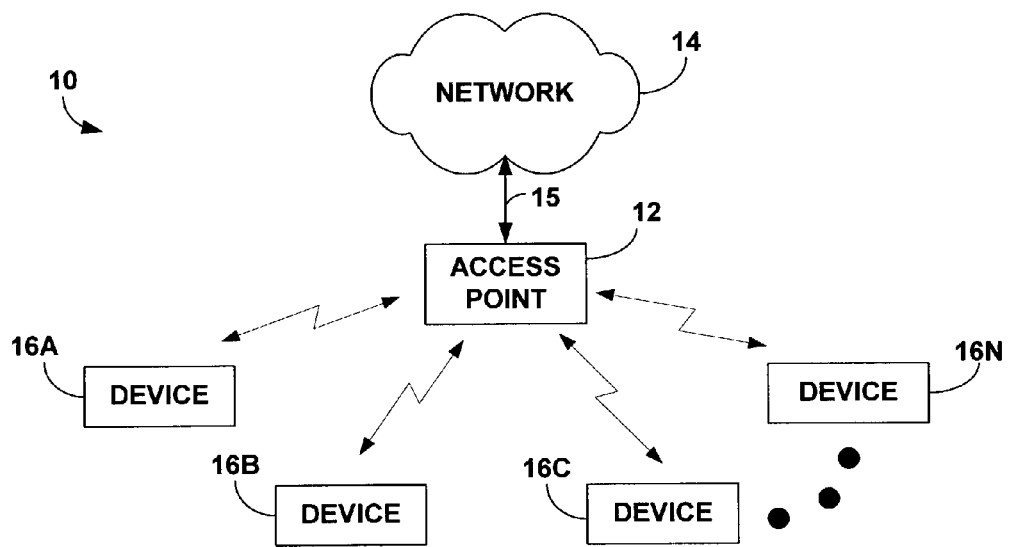
FIG. 1 is a block diagram illustrating a wireless communication network.

FIG. 1 is a block diagram illustrating a wireless communication network 10. Wireless communication network 10 includes at least one wireless access point 12 coupled to a wired network 14 via a link 15. Wireless access point 12 permits wireless communication between wired network 14 and one or more wireless communication devices 16A-16N ("wireless communication devices 16"). Wireless access point 12 may integrate a hub, a switch or a router (not shown) to serve multiple wireless communication devices 16. Wireless communication network 10 may be used to communicate data, voice, video and the like between devices 16 and wired network 14 according to a variety of different wireless transmission techniques, such as Orthogonal Frequency Division Multiplexing (OFDM). Network 14 may be a local area network (LAN), wide area network (WAN) or global network such as the Internet. Link 15 may be an Ethernet or other network connection.

As will be described, wireless communication devices 16 may include FFT/IFFT units having a random access memory (RAM)-based architecture that promotes reduced latency and reduced memory requirements. In particular, wireless communication devices 16 may be equipped with FFT/IFFT units that selectively input data from RAM for FFT or IFFT processing, and selectively output processed data to realize a desired output order. The use of a RAM-based FFT/IFFT unit and efficient storage and retrieval operations serve to simplify data reordering for increased throughput. Although an integrated FFT/IFFT unit will be described herein for purposes of example, the FFT and IFFT operations may be performed by independent FFT and IFFT units.

Figure 2:
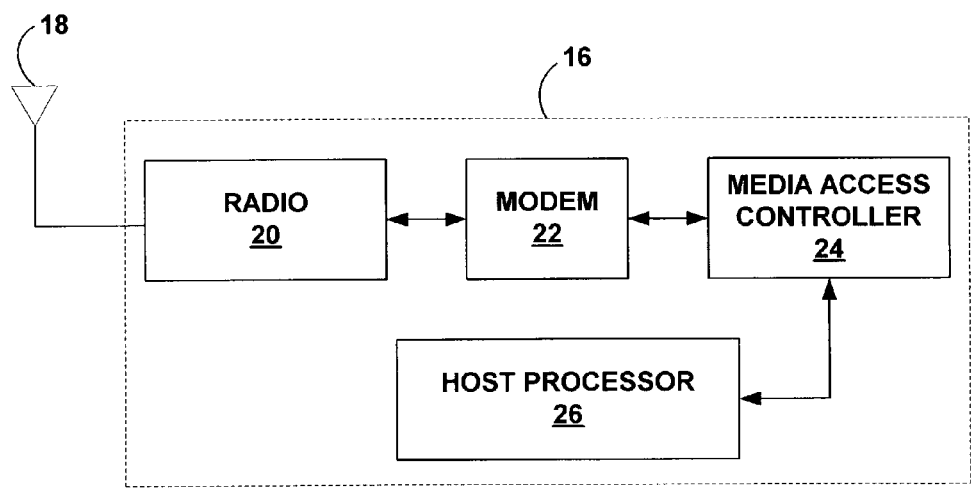
FIG. 2 is a block diagram illustrating a wireless communication device in further detail.

FIG. 2 is a block diagram illustrating a wireless communication device 16 in further detail. Wireless communication device 16 includes a radio frequency (RF) antenna 18, a radio 20, a modem 22, a media access controller (MAC) 24 and host processor 26. Wireless communication device 16 may take the form of a variety of wireless equipment, such as computers, personal computer cards, e.g., PCI or PCMCIA cards, personal digital assistants (PDAs), network audio or video appliances, and the like.

RF antenna 18 may receive and transmit RF signals between wireless communication device 16 and access point 12 within wireless communication network 10 (FIG. 1). Although FIG. 2 depicts the use of a single RF antenna 18, wireless communication device 16 may include more than one RF antenna 18. For example, wireless communication device 16 may include one RF antenna for receiving RF signals and another RF antenna for transmitting RF signals.

Radio 20 and modem 22 function together as a wireless transceiver. Radio 20 may include circuitry for upconverting transmitted signals to RF, and downconverting RF signals to baseband signals. In this sense, radio 20 may integrate both transmit and receive circuitry within a single transceiver component. In some cases, however, transmit and receive circuitry may be formed by separate transmitter and receiver components.

Modem 22 encodes information in a baseband signal for upconversion to the RF band by radio 20 and transmission via RF antenna 18. Similarly, modem 22 decodes information from RF signals received via antenna 18 and downconverted to baseband by radio 20. As will be described, modem 22 performs FFT processing to demodulate signals received from wireless communication network 10. Similarly, modem 22 performs IFFT processing to modulate signals for transmission via wireless communication network 10.

MAC 24 interacts with host processor 26 to facilitate communication between modem 22 and a host wireless communication device 16, e.g., a computer, PDA or the like. Hence, host processor 26 may be a central processing unit (CPU) within a computer or some other device. Radio 20, modem 22 and MAC 24 may be integrated on a common integrated circuit chip, or realized by discrete components.

Wireless communication network 10 (FIG. 1), access point 12 and wireless communication device 16 (FIG. 2) may conform to a variety of wireless networking standards, such as the IEEE 802.11a standard. The IEEE 802.11a standard, in particular, specifies a format for radio frequency (RF) transmission of orthogonal frequency division multiplexed (OFDM) data. The OFDM symbols transmitted according to the IEEE 802.11a standard occupy a 20 MHz bandwidth, which is divided into 64 equally spaced frequency bands.

The FFT or IFFT algorithm may adhere to the IEEE 802.11a standard. For example, the input data and output data of the FFT or IFFT algorithm may be ordered to adhere to the standard. A signal transmitted in accordance with the 802.11a standard may, for example, have observation samples ranging from $-\pi$ to $\pi$. For IFFT processing, however, the IFFT algorithm requires the input data to range from 0 to $2\pi$. To that end, the IFFT algorithm may be configured to read the data from memory in a different order than it was originally received, such that the data is ranges from 0 to $2\pi$.

Figure 3:
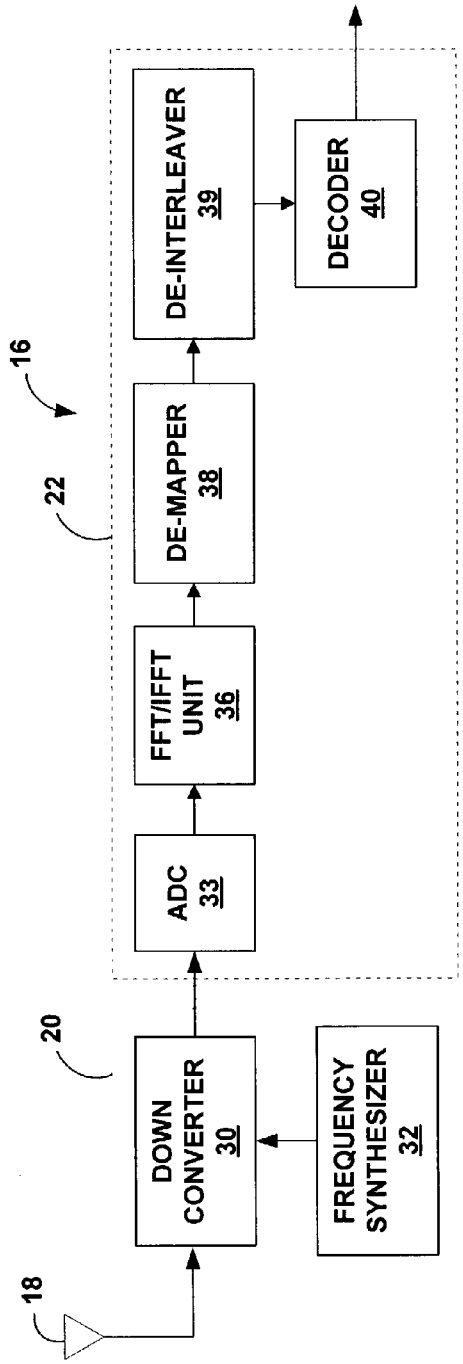
FIG. 3 is a block diagram illustrating radio and modem circuitry within a wireless communication device for demodulation of an inbound (radio frequency) RF signal.

FIG. 3 is a block diagram illustrating radio and modem circuitry within a wireless communication device 16 for demodulation of an inbound RF signal. Similar radio and modem circuitry may be implemented in wireless access point 12. As shown in FIG. 3, radio 20 may include a downconverter 30 that receives an RF signal via an RF antenna 18. Downconverter 30 mixes the received RF signal with a signal received from a frequency synthesizer 32 to convert the RF signal down to a baseband frequency. Radio 20 also may include a low noise amplifier and other signal conditioning circuitry (not shown).

Modem 22 may include an analog-to-digital converter (ADC) 33 that produces a digital representation of the baseband signal. ADC 33 may include an amplifier (not shown) that applies a gain to the analog baseband signal prior to conversion to a digital signal.

The digital signal enters an FFT/IFFT unit 36, and a portion of the digital signal is stored in a RAM. For example, FFT/IFFT unit 36 may receive a data sample representative of the signal every clock cycle, and store the data sample in the RAM. In this manner, FFT/IFFT implicitly converts the input from serial to parallel. FFT/IFFT unit 36 produces FFT outputs to demodulate the signal. FFT/IFFT unit 36 has a RAM-based architecture that promotes efficient storage and retrieval operations, in accordance with the invention, that serve to simplify data reordering for increased throughput. In particular, FFT/IFFT unit 36 selectively inputs data from RAM for FFT or IFFT processing, and selectively outputs processed data to realize a desired output order.

FFT/IFFT unit 36 serializes the output before transmission by outputting a single output data sample each clock cycle. A signal de-mapper 38 uses a predetermined constellation to translate complex values obtained from the signal to phase and amplitude information for a subchannel on which the signal was received. The signal passes through a de-interleaver 39 before a decoder 40 decodes the information carried by the received signal. In particular, decoder 40 decodes the information carried by a given tone and produces a stream of serial data for transmission to host processor 26 via MAC 24 (FIG. 2).

Figure 4:
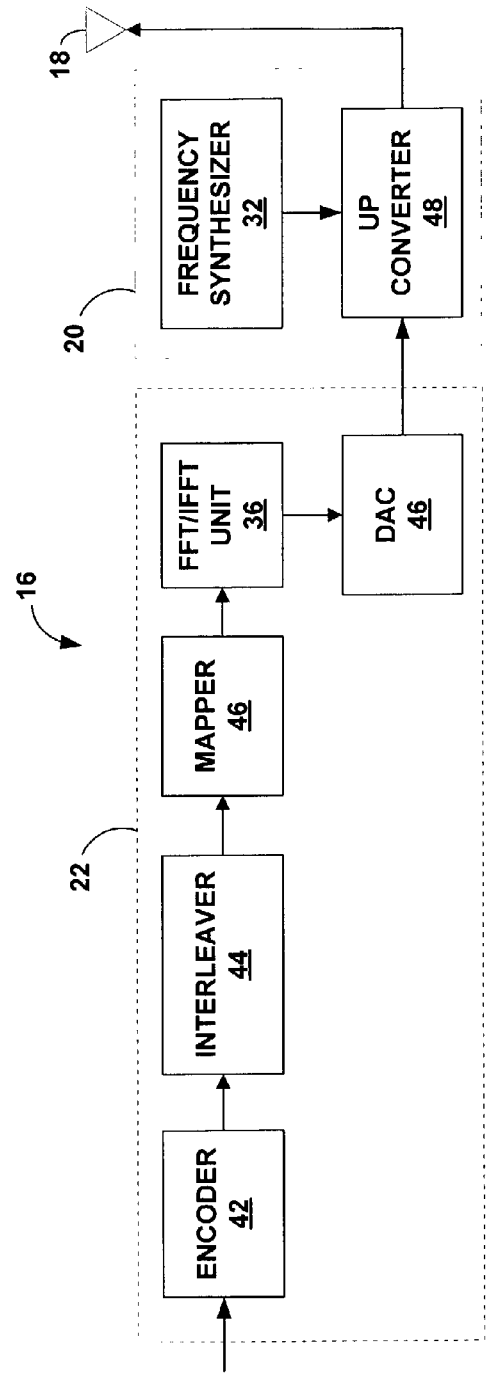
FIG. 4 is a block diagram illustrating radio and modem circuitry within a wireless communication device for modulation of an outbound radio frequency (RF) signal.

FIG. 4 is a block diagram illustrating radio and modem circuitry within a wireless communication device 16 for modulation of an outbound RF signal. Again, similar circuitry may be incorporated in wireless access point 12. As shown in FIG. 4, modem 22 includes an encoder 42 that encodes information to be carried by the RF signal. The encoded information passes through an interleaver 44 to minimize burst errors within a data channel. Modem 22 applies the output of interleaver 44 to a signal mapper 46. Signal mapper 46 maps the amplitude and phase of a data subchannel on which the signal is to be transmitted to a set of complex values according to a predetermined constellation using techniques such as quadrature amplitude modulation (QAM). FFT/IFFT unit 36 inputs the information, and stores at least a portion of the information in a RAM, in turn converting the input from serial input to parallel input.

FFT/IFFT unit 36 performs IFFT processing on the input data in order to convert the frequency domain signal into time domain samples. More specifically, FFT/IFFT unit 36 performs various stages of arithmetic operations to modify the input data from a frequency domain to a time domain. As described in detail below, FFT/IFFT unit 36 selectively inputs data from RAM for FFT or IFFT processing, and selectively outputs processed data to realize a desired output order. FFT/IFFT unit 36 may further append a guard interval to the data to prevent intersymbol interference (ISI), e.g., according to some wireless communication standards such as IEEE 802.11a. The guard interval may, for example, be a copy of a trailing portion of the data appended to the front of the output data. A digital-to-analog converter (DAC) 37 converts the time-domain samples to an analog modulating symbol, and relays the analog signal to a radio 20.

Radio 20 includes an upconverter 48 that receives an analog baseband signal from modem 22, and upconverts the analog baseband signal to an RF signal. More particularly, upconverter 48 mixes the baseband signal with a signal received from a frequency synthesizer 32 to convert the baseband signal to an RF signal. Radio 20 transmits the signal to wireless communication network 10 via an RF antenna 18.

Figure 5:
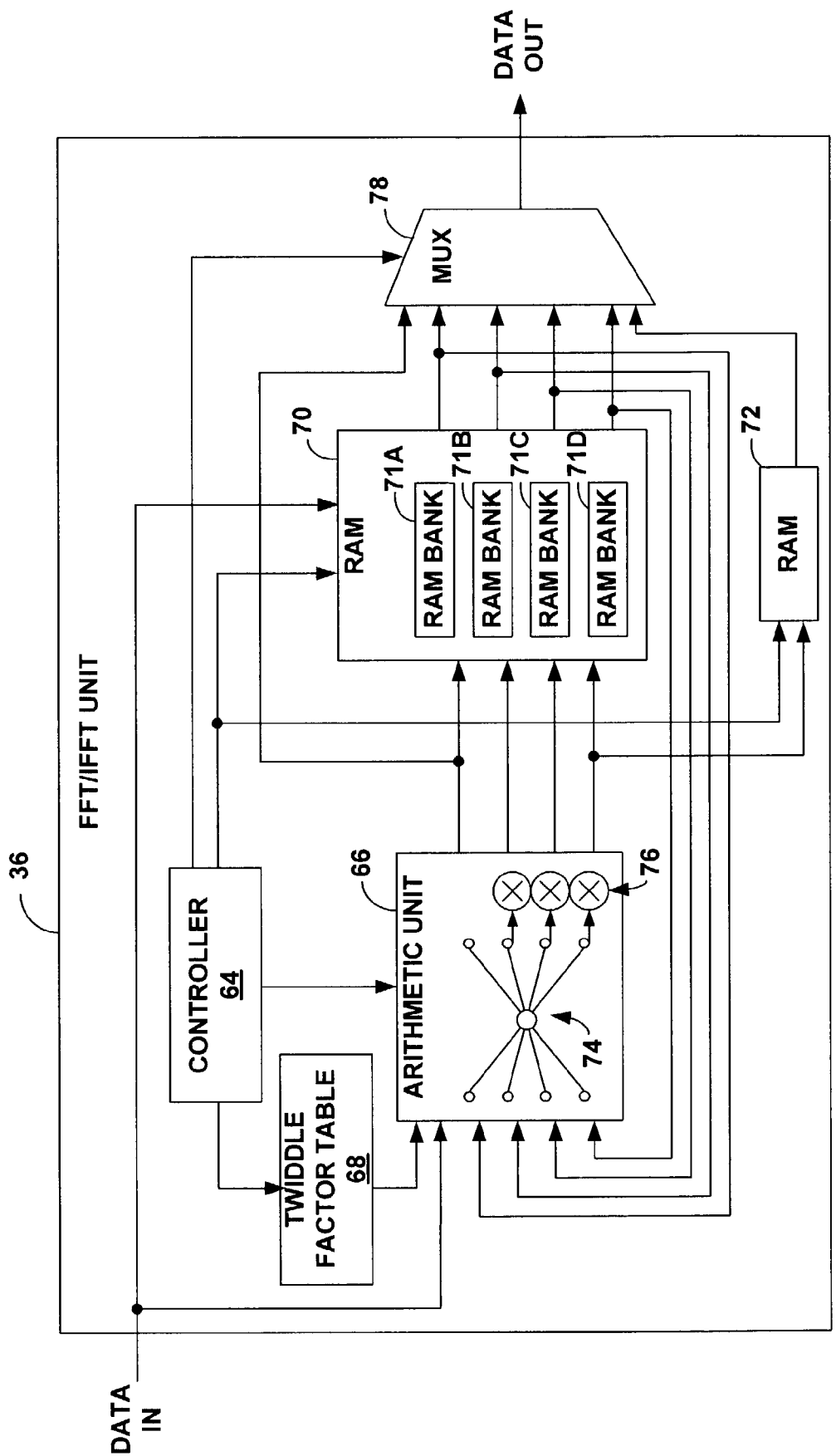
FIG. 5 is a block diagram illustrating an exemplary embodiment of a fast Fourier transform/inverse fast Fourier transform (FFT/IFFT) unit in accordance with the invention.

FIG. 5 is a block diagram illustrating an exemplary embodiment of an FFT/IFFT unit 36 that implements fast Fourier transforms (FFTs) and inverse fast Fourier transforms (IFFTs). Again, the FFT and IFFT functions may be realized by independent FFT and IFFT units. For purposes of illustration, however, an FFT/IFFT unit 36 will be described. FFT/IFFT unit 36 is constructed to promote reduced latency and reduced memory requirements. FFT/IFFT unit 36 makes use of a random access memory (RAM)-based data manipulation and efficient storage and retrieval operations to simplify data reordering for increased throughput.

In the example of FIG. 5, FFT/IFFT unit 36 includes a controller 64 that controls the operation of an FFT or IFFT algorithm implemented by FFT/IFFT unit 36. Controller 64 selectively chooses input data for an arithmetic unit 66, and sends a control signal to arithmetic unit 66 indicating whether to perform FFT or IFFT processing. The data input to arithmetic unit 66 may include data from a twiddle factor table 68, input data directly from an observation sample of a received signal, and data stored in a random access memory (RAM) 70.

Arithmetic unit 66 may include, for example, a butterfly operation unit 74 followed by a set of multipliers 76 that multiply a portion of the results of butterfly operation unit 74 with twiddle factors from twiddle factor table 68. Twiddle factors, as used herein, refer to coefficients used to combine results generated from a previous butterfly operation stage to form inputs to a next butterfly operation stage. To facilitate adherence to 802.11a standards, RAM 70 stores data sample points in memory units (not shown). The data sample points stored by RAM 70 may include input data from ADC 33 and mapper 46 (FIGS. 3 and 4, respectively), intermediate data between different stages of the FFT or IFFT algorithm, output results of the FFT or IFFT and the like. FFT/IFFT unit 36 may further include a guard interval RAM 72 that stores output data results from IFFT processing to be appended to the output signal as a guard interval.

In the example of FIG. 5, RAM 70 includes RAM memory banks 71A-71D (RAM memory banks 71). In order to adhere to the IEEE 802.11a standard, for example, each of RAM memory banks 71 may include sixteen memory units, for a total of sixty-four memory units. RAM memory banks 71 further include a read port and a write port (not shown) for reading data from RAM memory banks 71 and writing data to RAM memory banks 71, respectively. Alternatively, in other embodiments, RAM 70 may be a single RAM memory bank with sixty-four memory units and four read and write ports, two RAM memory banks with two read ports and two write ports per bank, or any other combination of banks and ports. Multiple RAM memory banks may consume less power than a single RAM memory bank with multiple read and write ports, and therefore may be more desirable for applications such as mobile wireless communication in which power consumption is a concern. Further, multiple RAM memory banks with a single read and write port utilize a smaller area than a single RAM memory bank with multiple read and write ports due to the reduced complexity of decoding circuitry for memory addressing.

FFT/IFFT unit 36 implements an FFT or IFFT process using a pipeline scheme to control data flow. The pipeline scheme implemented by FFT/IFFT unit 36 may include multiple stages of arithmetic units 66, in which controller 64 selectively chooses data from RAM 70 as input for arithmetic unit 66, and selectively outputs data from FFT/IFFT unit 36 to realize a desired output order. To selectively output data from FFT/IFFT unit 36, controller 64 sends a control signal to a multiplexer unit (MUX) 78 to determine which of the inputs to MUX 78 to output. Inputs to MUX 78 may include, for example, entries from RAM 70 and one or more results from arithmetic unit 66. Although discussed for a 64-point FFT/IFFT algorithm, the principles of the invention may be implemented with any number of data sample points. A different number of data sample points may result in a different number of memory banks, read ports, write ports, and memory units.

In operation, FFT/IFFT unit 36 receives input data sample points (DATA IN), e.g., from ADC 33 or mapper 46. FFT/IFFT unit 36 stores a portion of the input data sample points in RAM 70, and selectively chooses input data samples from RAM 70 as input for arithmetic unit 66. Controller 70 selectively controls addressing of RAM memory banks 71 to drive reading of data sample points from RAM 70, and corresponding twiddle factors as input for arithmetic unit 66. Arithmetic unit 66 may further receive input data directly from an observation sample for a received signal. Arithmetic unit 66 applies butterfly operation unit 74 to the four data sample points, and multiplies a portion of the results by corresponding twiddle factors using multipliers 76. A radix-4 FFT butterfly operation receives four inputs x0, x1, x2, and x3, and generates four outputs y0, y1, y2, and y3 in accordance with the expressions below.

$$y0=x0+x1+x2+x3$$

$$y1=x0-j\cdot x1-x2+j\cdot x3$$

$$y2=x0-x1+x2-x3$$

$$y3=x0+j\cdot x1-x2-j\cdot x3$$

A radix-4 IFFT butterfly operation differs slightly from a radix-4 FFT butterfly operation in the signs of the outputs. For example, a radix-4 IFFT butterfly operation receives four inputs x0, x1, x2, and x3, and generates four outputs y0, y1, y2, and y3 in accordance with the expressions below.

$$y0=x0+x1+x2+x3$$

$$y1=x0+j\cdot x1-x2-j\cdot x3$$

$$y2=x0-x1+x2-x3$$

$$y3=x0-j\cdot x1-x2+j\cdot x3$$

Controller 64 controls addressing of RAM memory banks 71 to drive writing of the outputs of arithmetic unit 66 into RAM 70, replacing the data read as inputs. In this manner, controller 64 may manipulate the data flow efficiently such that each data sample point can be discarded immediately after use, resulting in a reduced memory requirement. FFT/IFFT unit 36 may output one of the results generated by arithmetic unit 66 (DATA OUT). At this time, control unit 64 stores an input data sample point of a second symbol in place of the output result, i.e., overwrites the data for the first symbol.

In order to read and write four simultaneously accessed positions, one from each of RAM memory banks 71, control unit 64 may be configured to implement a memory addressing technique as described herein. For example, control unit 64 may have a read/write pattern similar to the one shown in TABLE 1 below for a three stage FFT/IFFT process.

TABLE 1

| Arithmetic operations | Read/Write pattern (4 simultaneously accessed addresses) | |
|---|---|---|
| First stage | k, k + 16, k + 32, k + 48 | k = 0, 1, ..., 15 |
| Second stage | k, k + 4, k + 8, k + 12 | k = 0, 1, 2, 3, 16, ..., 19, 32, ..., 35, 48, ..., 51 |
| Third stage | k, k + 1, k + 2, k + 3 | k = 4n, n = 0, 1, ..., 15 |

In TABLE 1, "k" represents an address of data that FFT/IFFT unit 36 accesses within RAM 70. The other addresses simultaneously accessed by FFT/IFFT unit 36 are increments of a constant as indicated in TABLE 1. For example, inputs for the first arithmetic unit 66 of the first stage are read from addresses 0, 16, and 32. The fourth input for the first arithmetic unit of the first stage is from an observation sample of a received signal. FFT/IFFT unit 36 writes the results of the first arithmetic unit 66 of the first stage to addresses 0, 16, 32, and 48. To avoid memory accessing conflict, the memory elements being accessed are in different memory banks 71. This is achieved by mapping the memory elements from a single bank with sixty-four memory units to a RAM with four memory banks, each having sixteen memory units, using following equations:

BankIndex=Address[5:4]+Address[3:2]+Address[1:0]

NewAddress=Address[5:2]

The BankIndex is the sum of all three 2-bit portions of a single bank address, which results in a 2-bit number. In particular, the BankIndex of an entry is calculated by summing the two most significant bits of the single bank address (Address[5:4]), the next two most significant bits of the single bank address (Address[3:2]), and the two least significant bits of the single bank address (Address[1:0]). For example, if the address in a single bank with sixty-four memory units is 16 (010000 in binary), the BankIndex is 1 (01+00+00). The bank index indicates the particular memory bank 71 of RAM 70 in which the data resides. NewAddress is the four most significant bits of the single bank address (Address[5:2]). In the example of conversion of single bank address 010000, the NewAddress is 4 (0100 in binary). In particular, NewAddress gives the 4-bit address of the data in the respective RAM memory bank 71. This mapping among four independent memory banks 71 ensures conflict free memory accessing with little added hardware cost.

Figure 6:
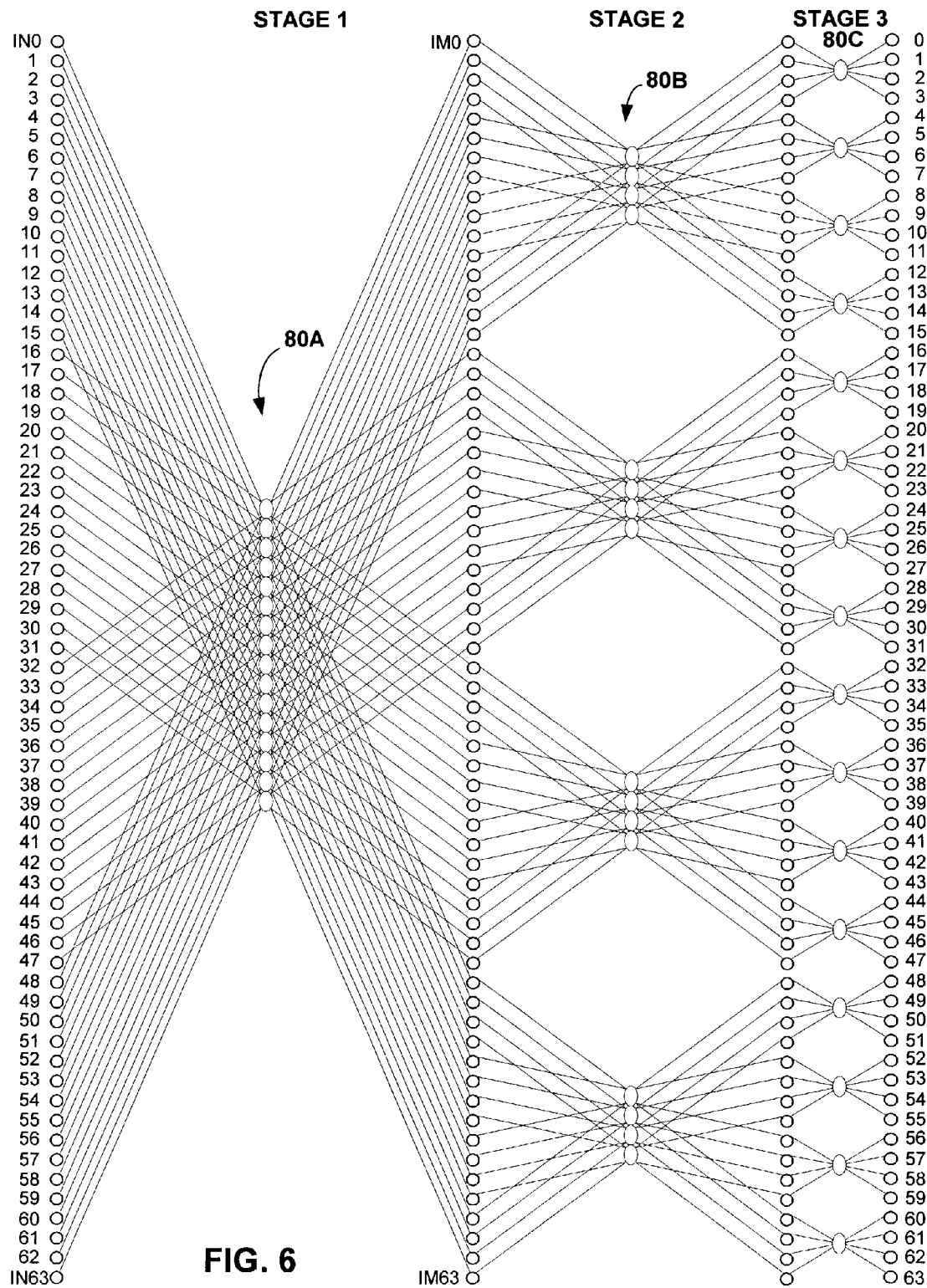
FIG. 6 is a signal flow graph illustrating a pipeline scheme suitable for implementation of 64-point radix-4 FFT algorithm.

FIG. 6 is a signal flow graph illustrating an FFT pipeline scheme used to perform a 64-point radix-4 FFT algorithm, e.g., as implemented by FFT/IFFT unit 36. In the signal flow graph of FIG. 6, input data enters FFT/IFFT unit 36 in a sequential order. FFT/IFFT unit 36 selectively inputs data for stages 80A-80C ("stages 80") of arithmetic units 66, and selectively outputs data from FFT/IFFT unit 36 to realize a desired output order, i.e., by selective addressing of the data entries in RAM memory banks 71. Generally, the desired output order in the example of FIG. 6 will be the same order in which FFT/IFFT unit 36 received the input.

Each column of the signal flow graph corresponds to one of stages 80. Each of stages 80 includes 16 arithmetic units 66. Each arithmetic unit 66 takes one clock cycle to perform both butterfly operation 74 and multiplications 76, in turn completing the FFT/IFFT algorithm for a given symbol observation in forty-eight clock cycles. In the example of FIG. 6, a first arithmetic unit 66 of stage 80A receives four inputs, IN0, IN16, IN32, and IN48. Because the last input of the first arithmetic unit 66 is the forty-ninth input data sample (IN48), FFT/IFFT unit 36 waits forty-eight clock cycles before beginning to process the input data. More specifically, during the first forty-eight clock cycles FFT/IFFT unit 36 will store the first forty-eight inputs, i.e., IN0-IN47 in RAM 70. In the next sixteen clock cycles, FFT/IFFT unit 36 inputs the last sixteen input data, i.e., IN48-IN63, while concurrently performing the operations associated with the sixteen arithmetic units 66 of stage 80A.

FFT/IFFT unit 36 stores the intermediate data of arithmetic units 66 of stage 80A in RAM 70, in place of the initial input data sample points. For example, in the forty-ninth clock cycle, FFT/IFFT unit 36 and, more particularly, arithmetic unit 66 inputs IN48. Concurrently, control unit 64 selectively chooses inputs IN0, IN16, and IN32 from RAM 70 for the first arithmetic unit 66. Arithmetic unit 66 applies butterfly operation unit 74, and multipliers 76 to the four input data sample points and outputs intermediate data IM0, IM16, IM32, and IM48 respectively. FFT/IFFT unit 36 stores the intermediate data in RAM 70 in place of the input data. For instance, intermediate data IM0 is written in place on IN0 in RAM 70.

If the wireless transmission standards applicable to wireless communication device 16 allow a second block of sixty-four input data sample points to come immediately after the end of the first block of input data sample points, the pipeline scheme may be implemented with a higher radix number. For example, for a 64-point FFT as described above, the pipeline scheme may use two stages of radix-8 arithmetic operations. However, with a higher radix number, the arithmetic unit and the addressing scheme become more complicated. Alternatively, a RAM with a larger number of memory units may be used to store the second block of input data sample points before finishing the second column of node operations on the first block of data sample points.

In the IEEE 802.11a specification, however, there is a guard interval of sixteen data sample points between each OFDM block of data sample points. In other words, the data sample points received during the next sixteen clock cycles do not require decoding and may be discarded. Utilizing this property, FFT/IFFT unit 36 may perform butterfly processing for stage 80B of arithmetic units 66 during the sixteen clock cycles associated with the guard interval, and then store all sixty-four intermediate data outputs in sixty-four memory units, essentially overwriting the previous intermediate data from stage 80A. During the following sixteen clock cycles, FFT/IFFT unit 36 performs operations associated with arithmetic units 66 of stage 80C, and concurrently receives an input data sample point from the second block of data sample points each clock cycle. However, FFT/IFFT unit 36 also outputs one data result of arithmetic unit 66 for each clock cycle, which creates a vacant memory unit to store the incoming data sample point. By discarding each input with the resultant output, the FFT/IFFT algorithm promotes reduced memory requirements.

After stage 80B of arithmetic units 66, all sixty-four intermediate results are stored in RAM 70, which FFT/IFFT unit 36 uses for stage 80C of arithmetic units 66. Because FFT/IFFT unit 36 utilizes a RAM-based architecture, it is possible to arbitrarily pick any order of data entries for the arithmetic operations of stage 80C. To obtain a correctly indexed output, i.e. an output sequentially indexed like the input, FFT/IFFT unit 36 applies the first arithmetic unit 66 of stage 80C first, followed by the fifth arithmetic unit 66, the ninth arithmetic unit 66 and so forth. FFT/IFFT unit 36 outputs the first result of the first arithmetic unit of stage 80C while all the other results are stored in RAM 70 and read out later. By the time the stored results are to be read out, the stored results will be freely accessible so FFT/IFFT unit 36 may output the results in any desired order by addressing RAM memory banks 71. This method reduces the latency cost and memory cost needed when buffering the output results to obtain a desired order.

In order to meet the requirements of the 802.11a standard, FFT/IFFT unit 36 may be configured to adjust the outputs of the radix-4 FFT algorithm to range from –π to π. In the implementation of the radix-4 FFT algorithm, the output ranges from 0 to 2π. In order to output the results in the order specified by the IEEE 802.11a standard, control unit 64 outputs the third result of arithmetic units 66 of stage 80C instead of outputting the first result. In this manner, the second half of the results are output first and the first half of the results are output last, resulting in an output that ranges from –π to π, even though the data in RAM 70 ranges from 0 to 2π.

The signal flow graph of the implementation of a 64-point radix-4 IFFT algorithm in FIG. 6 flows in the opposite direction as the signal flow graph of the 64-point radix-4 FFT algorithm. Mainly, stage 80C of arithmetic units 66 becomes stage 80A, and stage 80A of arithmetic units 66 becomes stage 80C. Further, in accordance with the IEEE 802.11a standards, the input data sample points of the IFFT will be indexed from –π to π. The radix-4 algorithm may need to read the inputs so that they appear to have been indexed from 0 to 2π. Again, to index the inputs correctly, control unit 64 may be configured to read different locations of RAM 70 to give the correctly indexed input data. Also, 802.11a requires a guard interval of 16 bits on the front of each OFDM signal. To create a 16-bit cyclic guard interval, control unit 64 utilizes the guard interval RAM 72. More particularly, control unit 64 outputs the last result of the third stage of arithmetic units 66, and saves the last sixteen results in RAM 70 for use at the end of the OFDM signal.

Figure 7:
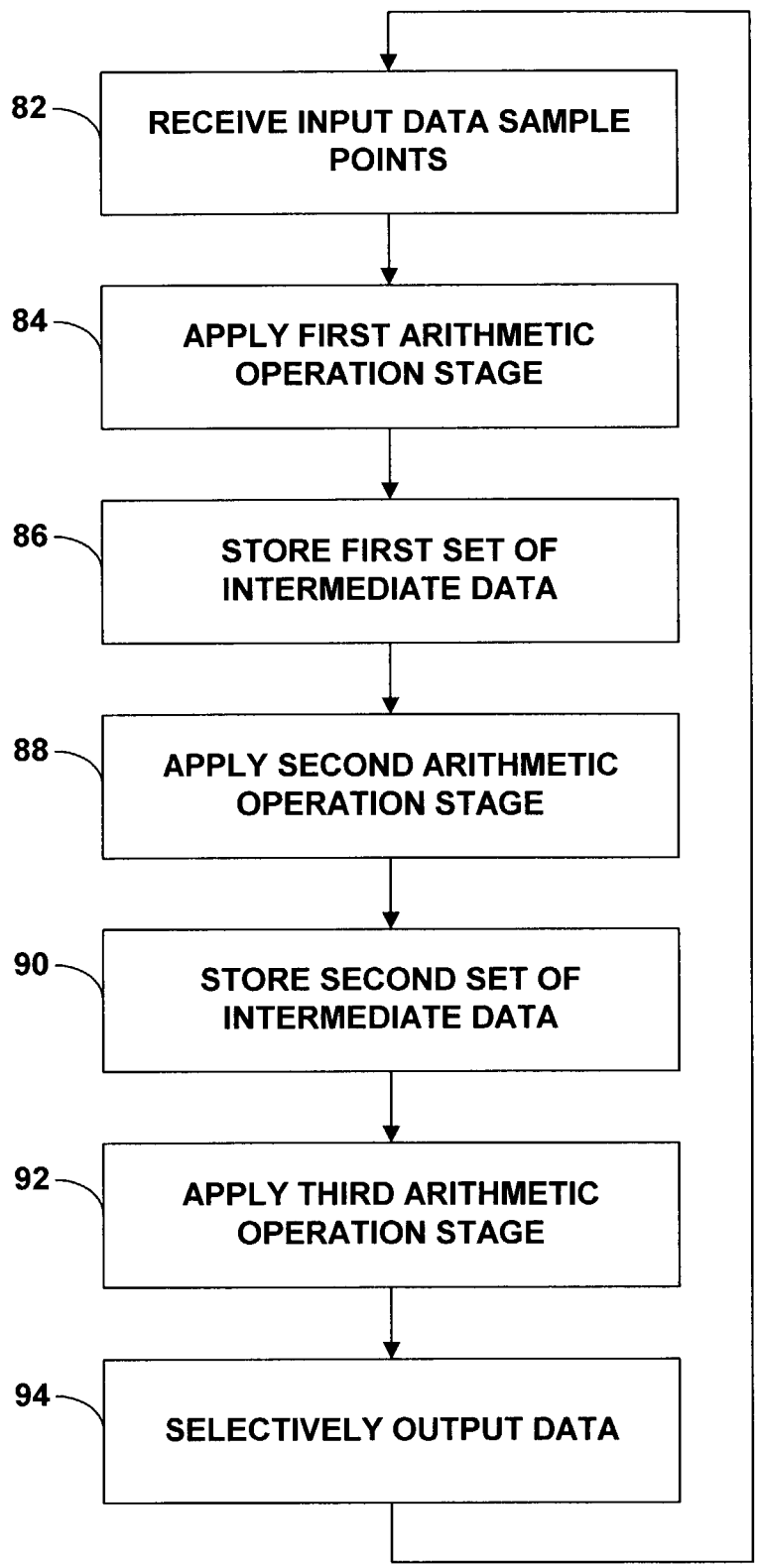
FIG. 7 is a flow diagram illustrating an exemplary mode of operation of an FFT/IFFT unit implementing the FFT algorithm illustrated in FIG. 6.

FIG. 7 is a flow diagram illustrating an exemplary mode of operation of FFT/IFFT unit 36 implementing the FFT algorithm illustrated in FIG. 6. FFT/IFFT unit 36 receives input data sample points representative of a communication signal (82). If the communication signal conforms to the IEEE 802.11a standard, FFT/IFFT unit 36 receives 64 data sample points. FFT/IFFT unit 36 applies operations associated with arithmetic operations 66 of stage 80A (84). For example, FFT/IFFT unit 36 may retrieve four data sample points from RAM 70, and apply butterfly operation unit 74 and multiplications 76 to the data sample points to obtain intermediate data. FFT/IFFT unit 36 stores the intermediate data in RAM 70, replacing the data sample points input to arithmetic operations 66 of stage 80A (86).

FFT/IFFT unit 36 applies operations associated with arithmetic operations 66 of stage 80B, and stores the intermediate data from stage 80B in RAM 70, replacing the intermediate data of stage 80A (88, 90). FFT/IFFT unit 36 applies operations associated with arithmetic operations 66 of stage 80C using the intermediate data from stage 80B as input (92). FFT/IFFT unit 36 selectively outputs the data of stage 80C (94). FFT/IFFT unit 36 may, for example, output one of the results of each arithmetic operation 66 of stage 80C, and store the rest of the results. The rest of the data may be output from RAM 70 in any desired order by simply reading from different addresses of memory banks 71 in RAM 70.

Various embodiments of the invention have been described. These and other embodiments are within the scope of the following claims.

The invention claimed is:

1. A method comprising:
   storing at least a portion of input data representative of a received communication signal in a random access memory (RAM) in a first order;
   reading the portion of the input data from the RAM;
   applying a fast Fourier transform (FFT) operation to the portion of the input data read from the RAM to produce intermediate data;
   replacing the portion of the input data stored in the RAM with the intermediate data output by the FFT operation in order to store the intermediate data in a second order in the RAM; and
   selectively addressing the RAM to retrieve the intermediate data in a third order.

2. The method of claim 1, wherein the third order and the first order have the same order.

3. The method of claim 1, wherein the RAM comprises a single RAM memory bank.

4. The method of claim 3, wherein the single RAM memory bank includes:
   multiple read ports for reading data from the RAM; and
   multiple write ports for writing data to the RAM.

5. The method of claim 1, wherein the RAM comprises multiple RAM memory banks.

6. The method of claim 5, wherein each of the RAM memory banks includes:
a read port for reading data from the RAM; and
a write port for writing data into the RAM.

7. The method of claim 5, further comprising addressing the RAM memory banks such that entries from the RAM memory banks are read concurrently.

8. The method of claim 5, further comprising addressing the RAM memory banks such that entries are written to the RAM memory banks concurrently.

9. The method of claim 1, wherein applying an FFT operation includes
performing arithmetic operations on the portion of the input data during a first stage of FFT operations to produce the intermediate data, and wherein replacing the portion of the input data stored in the RAM with the intermediate data includes writing the intermediate data output by the arithmetic operations to the RAM.

10. The method of claim 1, wherein applying an FFT operations includes:
applying an FFT butterfly operation; and
multiplying at least a portion of the data output by the FFT butterfly operation by a twiddle factor.

11. The method of claim 1, further comprising discarding a guard interval of the communication signal.

12. The method of claim 1, further comprising applying one or more stages of FFT operations to perform FFT processing.

13. The method of claim 1, further comprising applying one or more stages of FFT operations to perform inverse FFT (IFFT) processing.

14. The method of claim 13, further comprising appending a guard interval to the intermediate data.

15. The method of claim 1, further comprising selectively retrieving input data for the FFT operation.

16. The method of claim 1, wherein selectively addressing the RAM to output the intermediate data in a third order includes reading a first portion of the intermediate data first and reading a second portion of the intermediate data second.

17. The method of claim 16, wherein the first portion of the intermediate data is the last half of the stored intermediate data, and the second portion of the intermediate data is the first half of the intermediate data.

18. The method of claim 1, wherein the input data representative of the communication symbol is 64 data sample points, and further comprising applying three stages of FFT operations.

19. The method of claim 1, wherein receiving input data representative of a communication signal includes receiving input data representative of an orthogonal frequency division multiplexing (OFDM) signal.

20. The method of claim 1, the input data includes N sample data points representative of the signal and the RAM includes N memory units.

21. The method of claim 1, wherein applying the plurality of stages of FFT operations comprises applying at least a portion of the last stage of FFT operations during a guard interval between communication signals.

22. The method of claim 1, further comprising overwriting the results of the last stage of the plurality of stages of FFT operations with input data of a subsequent communication signal concurrently with outputting the results.

23. The method of claim 1, further comprising outputting a portion of the intermediate data produced by the FFT operation.

24. The method of claim 1, wherein applying an FFT operation includes applying an FFT butterfly operation.

25. The method of claim 24, wherein applying an FFT butterfly operation include applying multiple FFT butterfly operations.

26. The method of claim 25, wherein applying multiple FFT operations comprises performing a plurality of stages of FFT butterfly operations.

27. The method of claim 26, further comprising:
performing a first stage of butterfly operations to obtain a first set of intermediate data;
storing the first set of intermediate data in the RAM;
performing a second stage of butterfly operations using the intermediate data from the first stage of butterfly operations as input for the second stage of butterfly operations to obtain a second set of intermediate results; and
replacing the first set of intermediate results in the RAM with the second set of intermediate results.

28. A device comprising:
a random access memory (RAM) that stores at least a portion of input data representative of a received communication signal;
a fast Fourier transform (FFT) unit that reads the portion of input data from the RAM, applies an FFT operation to the portion of the input data read from the RAM to produce intermediate data, and replaces the portion of the input data stored in the RAM with the intermediate data output by the FFT operation in order to store the intermediate data in a second order in the RAM; and
a controller that selectively addresses the RAM to retrieve the intermediate data in a third order.

29. The device of claim 28, wherein the FFT unit applies a plurality of stages of FFT operations, and wherein the RAM outputs results of a last stage of plurality of stages of FFT operations in a third order.

30. The device of claim 28, wherein the RAM includes multiple RAM memory banks.

31. The device of claim 30, wherein each of the RAM memory banks includes:
a read port; and
a write port.

32. The device of claim 28, wherein the RAM includes:
multiple read ports; and
multiple write ports.

33. The device of claim 28, further comprising a second random access memory (RAM) that stores data for a guard interval.

34. The device of claim 28, wherein the FFT unit applies an FFT butterfly operation to the input data.

35. The device of claim 28, further comprising a twiddle factor table that stores twiddle factors.

36. The device of claim 35, wherein the FFT unit applies an FFT butterfly operation, and multiplies a portion of the results of the FFT butterfly operation by twiddle factors from the twiddle factor table.

37. The device of claim 28, wherein the FFT operation includes an IFFT operation.

38. The device of claim 28, wherein the first order and the third order have the same order.

39. The device of claim 28, wherein the input data includes N sample data points representative of the signal and the RAM includes N memory units.

40. The device of claim 28, wherein the communication signal is an orthogonal frequency division multiplexing (OFDM) signal.

41. The device of claim 28, wherein the device is a wireless communication device.

42. The device of claim 28, wherein the communication signals are wireless communication signals.

43. The device of claim 42, wherein the wireless communication signals are transmitted according to the IEEE 802.11a standard.

* * * * *